(12) United States Patent
Schulz

(10) Patent No.: US 7,753,275 B2
(45) Date of Patent: Jul. 13, 2010

(54) MAGNETIC CARD READER, ESPECIALLY FOR POINT OF SALE TERMINALS

(75) Inventor: Christian Eric Schulz, Rocklin, CA (US)

(73) Assignee: Verifone, Inc., San Jose, CA (US)

( * ) Notice: Subject to any disclaimer, the term of this patent is extended or adjusted under 35 U.S.C. 154(b) by 322 days.

(21) Appl. No.: 11/856,460

(22) Filed: Sep. 17, 2007

(65) Prior Publication Data

US 2009/0072033 A1 Mar. 19, 2009

(51) Int. Cl.
  *G06K 7/08* (2006.01)
  *G06K 5/00* (2006.01)
  *G06K 7/00* (2006.01)
(52) U.S. Cl. .................... 235/449; 235/380; 235/439
(58) Field of Classification Search .............. 235/380, 235/381, 383, 439, 449; 360/2, 240
See application file for complete search history.

(56) References Cited

U.S. PATENT DOCUMENTS

| | | | | |
|---|---|---|---|---|
| 3,949,193 | A * | 4/1976 | Dowdell | 235/449 |
| 4,028,734 | A * | 6/1977 | Mos | 360/240 |
| 4,184,179 | A * | 1/1980 | Deming | 360/44 |
| 4,538,191 | A | 8/1985 | Suzuki et al. | |
| 4,631,610 | A | 12/1986 | Kobayashi et al. | |
| 5,196,680 | A | 3/1993 | Schuder et al. | |
| 5,270,523 | A | 12/1993 | Chang et al. | |
| 5,945,654 | A * | 8/1999 | Huang | 235/449 |
| 6,250,552 | B1 * | 6/2001 | Hirasawa | 235/475 |
| 6,342,982 | B1 * | 1/2002 | Kanayama et al. | 360/2 |
| 6,585,156 | B2 | 7/2003 | Takita et al. | |
| 6,601,765 | B2 * | 8/2003 | Yuan | 235/449 |
| 6,817,524 | B2 * | 11/2004 | Hilton et al. | 235/449 |
| 6,866,201 | B2 * | 3/2005 | Abe et al. | 235/493 |
| 6,927,928 | B2 | 8/2005 | Nakabo et al. | |
| 7,347,370 | B2 * | 3/2008 | McJones | 235/449 |

FOREIGN PATENT DOCUMENTS

| | | |
|---|---|---|
| JP | 2281464 | 11/1990 |
| JP | 4060910 | 2/1992 |

\* cited by examiner

*Primary Examiner*—Thien M. Le
*Assistant Examiner*—April A Taylor
(74) *Attorney, Agent, or Firm*—Fish & Richardson P.C.

(57) ABSTRACT

A point of sale device including a housing, a magnetic card reader disposed in the housing, the magnetic card reader including at least first and second heads, a flexible circuit board electrically coupled to the first and second heads and a unitary resilient head mounting element resiliently supporting the at least first and second heads independently of the flexible circuit board and electronic circuitry coupled to the magnetic card reader.

22 Claims, 5 Drawing Sheets

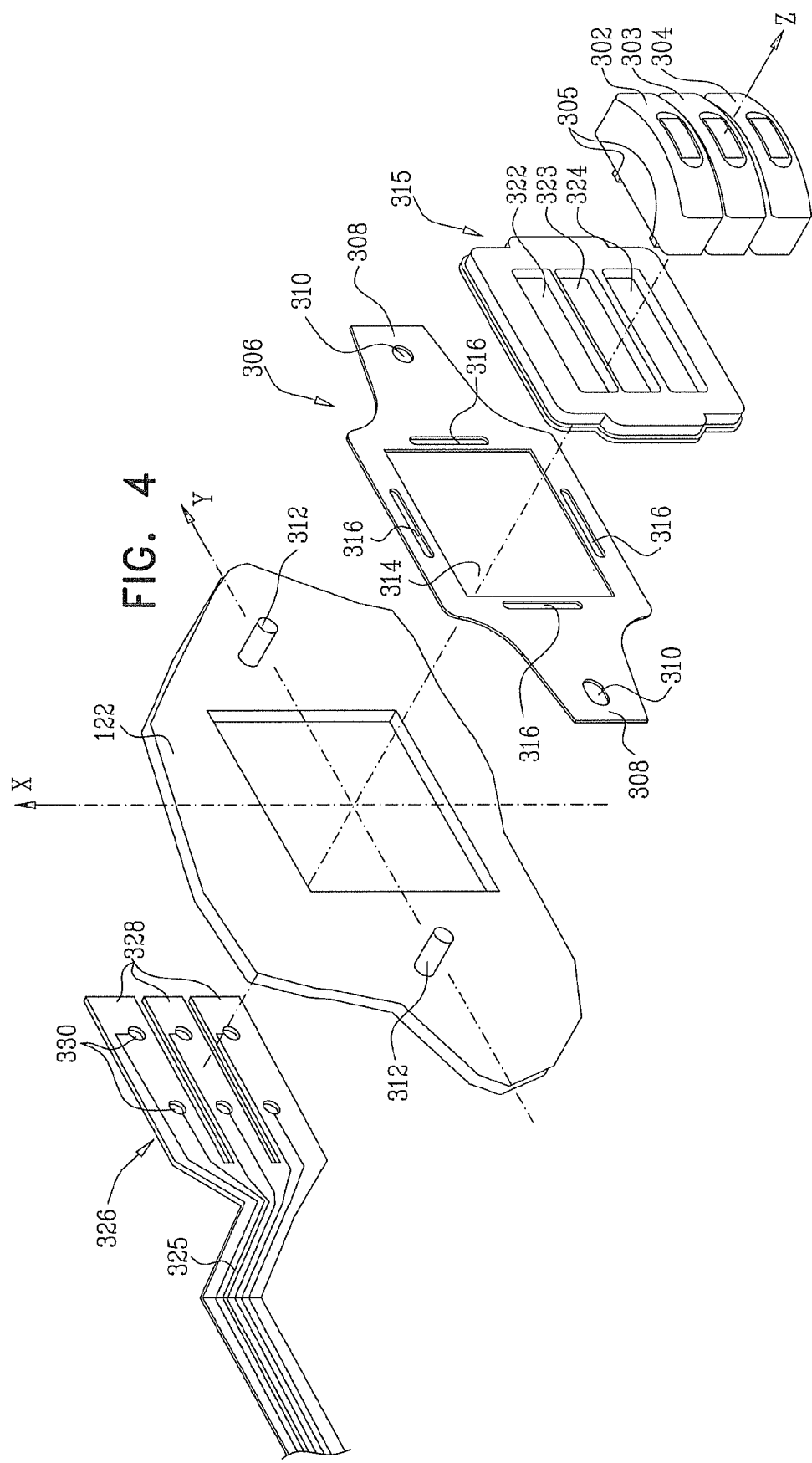

MAGNETIC CARD READER, ESPECIALLY FOR POINT OF SALE TERMINALS

FIELD OF THE INVENTION

The present invention relates to magnetic card readers generally and more particularly to point of sale devices including magnetic card readers.

BACKGROUND OF THE INVENTION

The following published patent documents are believed to represent the current state of the art: U.S. Pat. Nos. 4,028,734; 4,631,610; 6,585,156 and 5,196,680.

SUMMARY OF THE INVENTION

The present invention seeks to provide an improved magnetic card reader and improved devices employing magnetic card readers.

There is thus provided in accordance with a preferred embodiment of the present invention a point of sale device including a housing, a magnetic card reader disposed in the housing, the magnetic card reader including at least first and second heads, a flexible circuit board electrically coupled to the first and second heads and a unitary resilient head mounting element resiliently supporting the at least first and second heads independently of the flexible circuit board and electronic circuitry coupled to the magnetic card reader.

There is also provided in accordance with another preferred embodiment of the present invention a magnetic card reader including at least first and second heads, a flexible circuit board electrically coupled to the first and second heads and a unitary resilient head mounting element resiliently supporting the at least first and second heads independently of the flexible circuit board.

Preferably, the at least first and second heads are mutually displaceable with respect to X, Y and Z axes. Additionally or alternatively, the magnetic card reader is configured to provide enhanced quality of reading bent, warped or otherwise misshapen magnetic cards.

Preferably, the head mounting element is formed of spring steel. Additionally, the head mounting element includes three-dimensionally flexible head mounting leaves, each of which is attached to a side of one of the at least first and second heads.

Preferably, the magnetic card reader includes a thermoplastic elastomer overmold element which is retained on the head mounting element and which frictionally engages the at least first and second heads in a three-dimensional flexible, resilient manner.

BRIEF DESCRIPTION OF THE DRAWINGS

The present invention will be understood and appreciated more fully from the following detailed description, taken in conjunction with the drawings in which:

FIG. 4 is a simplified exploded view pictorial illustration of a magnetic card reader constructed and operative in accordance with another preferred embodiment of the present invention;

DETAILED DESCRIPTION OF PREFERRED EMBODIMENTS

Figure 1:
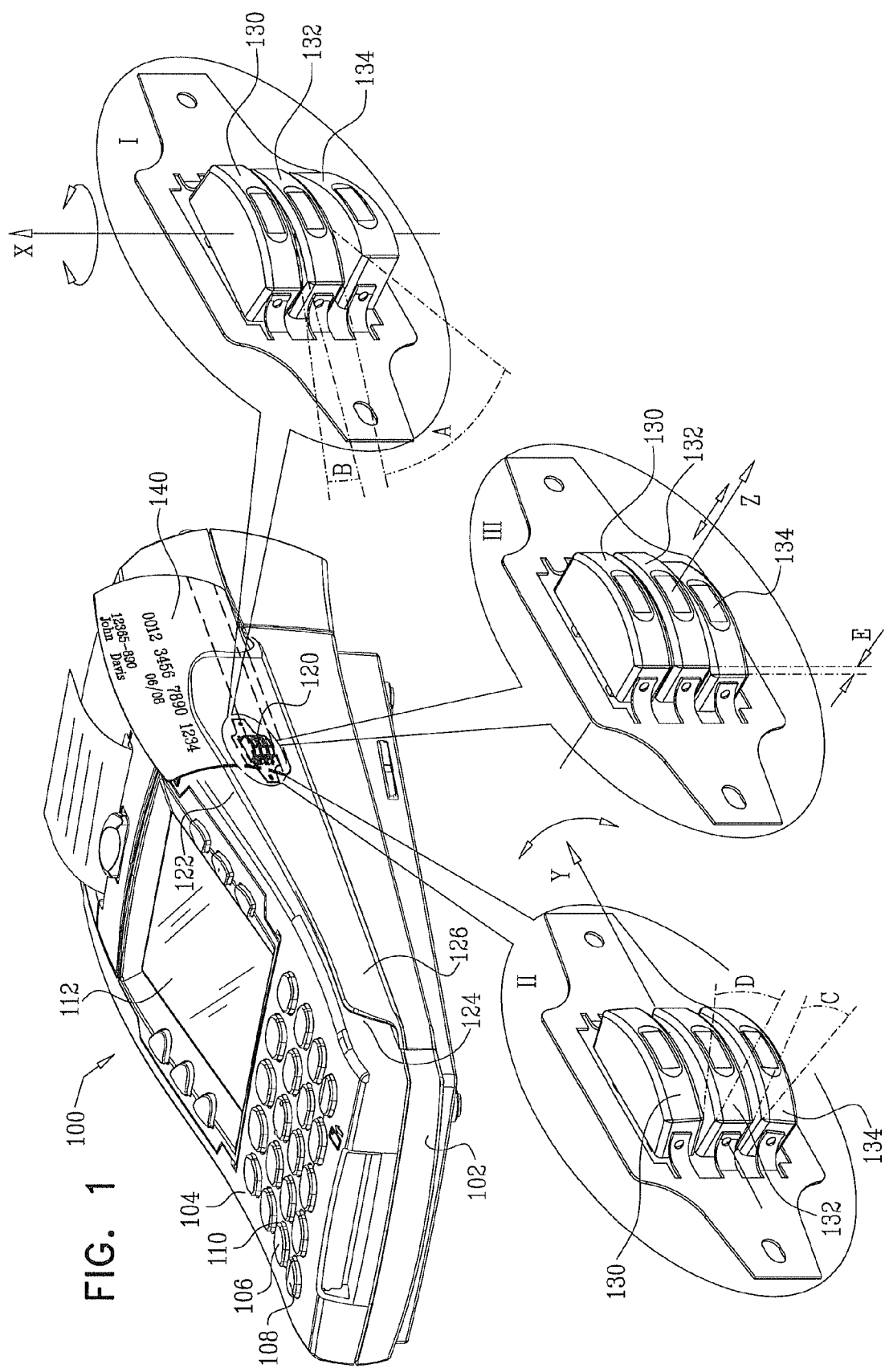
FIG. 1 is a simplified pictorial illustration of a point of sale device including a magnetic card reader constructed and operative in accordance with a preferred embodiment of the present invention.

Reference is now made to FIG. 1, which is a simplified pictorial illustration of a point of sale device including a magnetic card reader constructed and operative in accordance with a preferred embodiment of the present invention.

For the purposes of the present description and claims, the phrase "point of sale device" includes, inter alia, a payment terminal, an electronic cash register, a pin pad, an ATM and a kiosk.

As seen in FIG. 1, a point of sale device 100 includes a housing formed of a bottom housing portion 102 and a top housing portion 104. A keypad assembly 106 includes keys 108 which extend through corresponding apertures 110 in top housing portion 104. A display 112 is also mounted on top housing portion 104.

A magnetic card reader 120 is located on an outer facing wall portion 122 of top housing portion 104, facing a card swipe slot 124, which is also defined by an upstanding wall 126. In accordance with a preferred embodiment of the present invention and as described hereinbelow in greater detail with reference to FIGS. 2-3B, the magnetic card reader 120 includes mutually displaceable heads 130, 132 and 134, which are preferably mutually displaceable with respect to X, Y and Z axes, as illustrated in an exaggerated manner respectively at enlargements I, II and III in FIG. 1. The mutual displaceability of heads 130, 132 and 134 enables the magnetic card reader to provide enhanced quality of reading bent, warped or otherwise misshapen magnetic cards, such as card 140.

Figure 2:
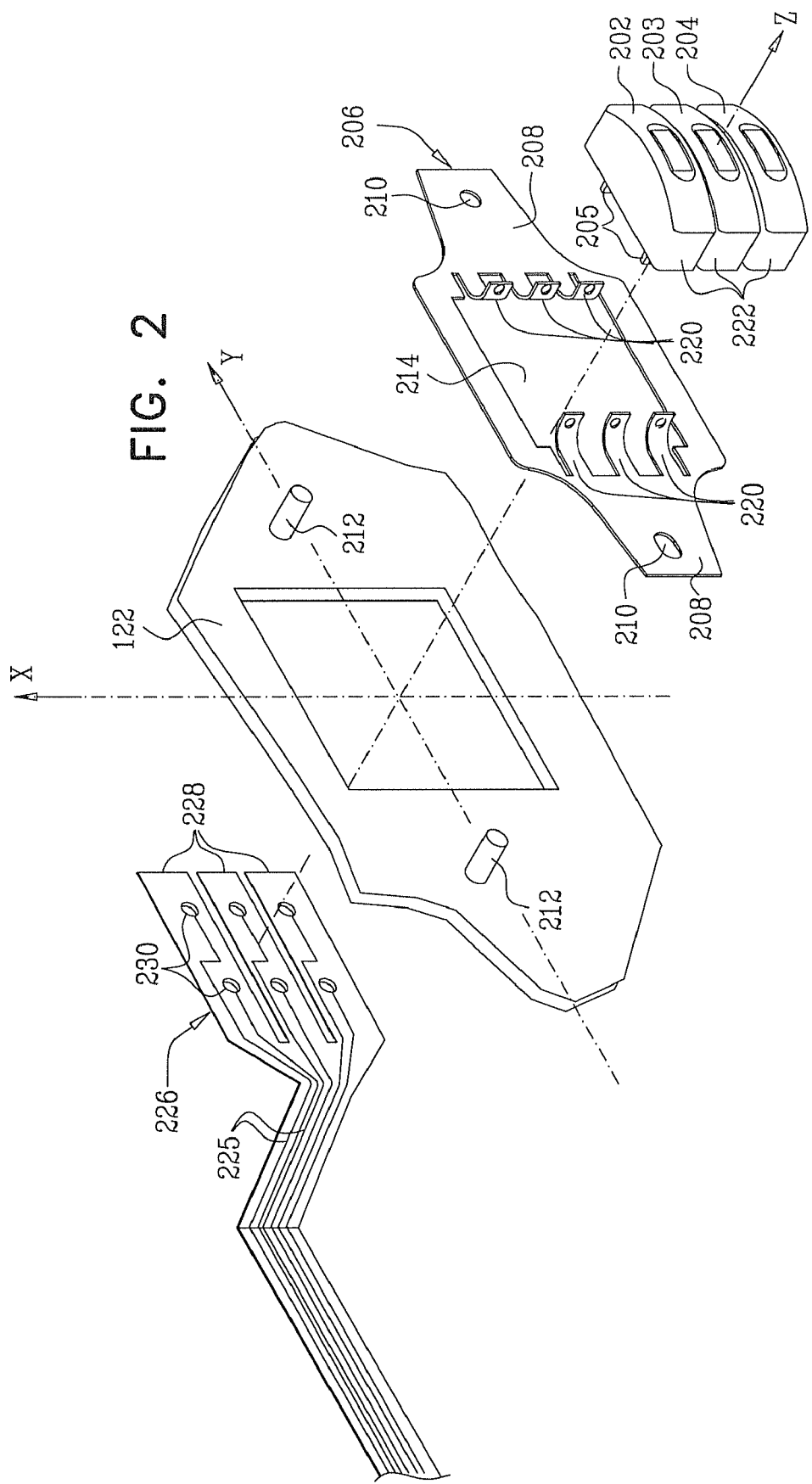
FIG. 2 is a simplified exploded view pictorial illustration of a magnetic card reader constructed and operative in accordance with a preferred embodiment of the present invention.
Figure 3A:
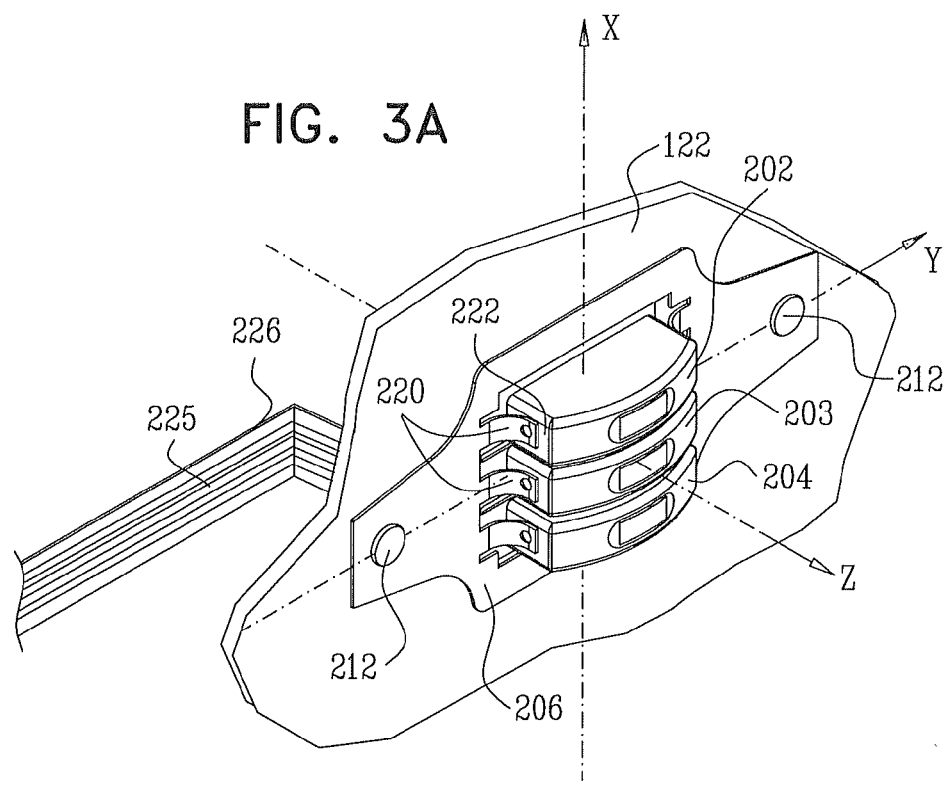
FIGS. 3A and 3B are assembled view pictorial illustrations of the magnetic card reader of FIG. 2.
Figure 3B:
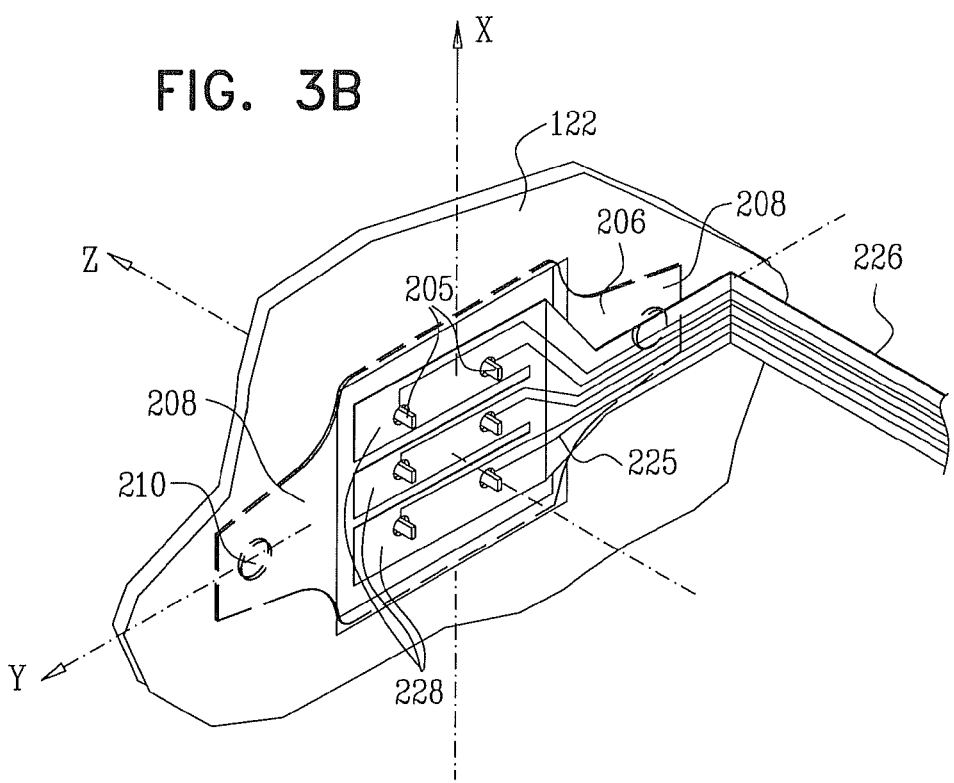

Reference is now made additionally to FIG. 2, which is a simplified exploded view pictorial illustration of a magnetic card reader constructed and operative in accordance with a preferred embodiment of the present invention and to FIGS. 3A and 3B, which are assembled view pictorial illustrations of the magnetic card reader of FIG. 2.

As seen in FIGS. 2, 3A and 3B, the magnetic card reader preferably includes three single track heads 202, 203 and 204, which may be of conventional construction and are commercially available from Apollo (Zhuhai) Electronics Co., Ltd. such as Model Nos. AP-1150B and AP-1150. Each of heads 202, 203 and 204 includes a pair of data connection pins 205.

In accordance with a preferred embodiment of the present invention, a head mounting element 206, preferably formed of spring steel, is provided with side portions 208 formed with apertures 210 which are configured to be engaged by protrusions 212 formed on wall 122 (FIG. 1). A central portion of head mounting element 206 is preferably formed with a generally rectangular aperture 214 for accommodating heads 202, 203 and 204. On both sides of aperture 214 there are provided preferably three-dimensionally flexible head mounting leaves 220, preferably six in total, each of which is preferably spot welded onto a side 222 of one of heads 202, 203 and 204, as seen clearly in FIG. 3A.

Pins 205 of each of heads 202, 203 and 204 are electrically connected to corresponding electrical conductors 225 of a flexible printed circuit element 226, which is formed with three mechanically independent fingers 228, each having apertures 230 for receiving pins 205 of a corresponding one of heads 202, 203 and 204.

Returning now to FIG. 1, a typical example of mutual rotation about the X axis is shown in enlargement I. Head 134 is seen rotated through an angle A about the X axis relative to head 132 in a first angular direction, while head 130 is rotated through an angle B about the X axis relative to head 132 in a second angular direction, opposite to the first angular direction. Such an orientation typically occurs when there are local deformities in the magnetic card 140.

A typical example of mutual rotation about the Y axis is shown in enlargement II. Head 134 is rotated through an angle C about the Y axis relative to head 132 in a first angular direction, while head 130 is rotated through an angle D about the Y axis relative to head 132 in a second angular direction, opposite to the first angular direction. Such an orientation typically occurs when the card is bowed as shown in FIG. 1 about the Y axis.

A typical example of mutual displacement along the Z axis is shown in enlargement III. Head 134 is seen to be depressed along the Z axis by a distance E relative to heads 130 and 132. Such an orientation typically occurs when the card is bowed as shown in FIG. 1 about the Z axis.

It is appreciated that the any suitable mutual rotation and/or displacement of heads 130, 132 and 134 may take place in order to accommodate the configuration of a given magnetic card 140. The mounting structure of heads 130, 132 and 134, described hereinabove with reference to FIGS. 2-3B is one preferred embodiment of enabling such mutual rotation and/or displacement. Another preferred mounting structure is shown in FIG. 4, it being appreciated that it is possible that other types of structures, not specifically shown herein, may also be suitable.

Figure 5A:
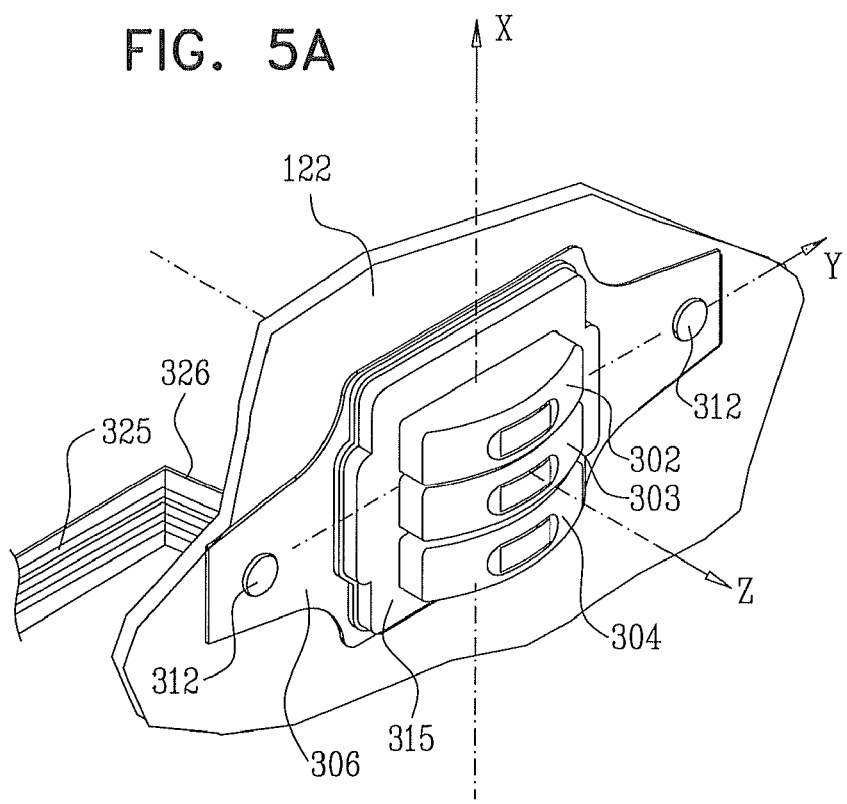
FIGS. 5A and 5B are assembled view pictorial illustrations of the magnetic card reader of FIG. 4.
Figure 5B:
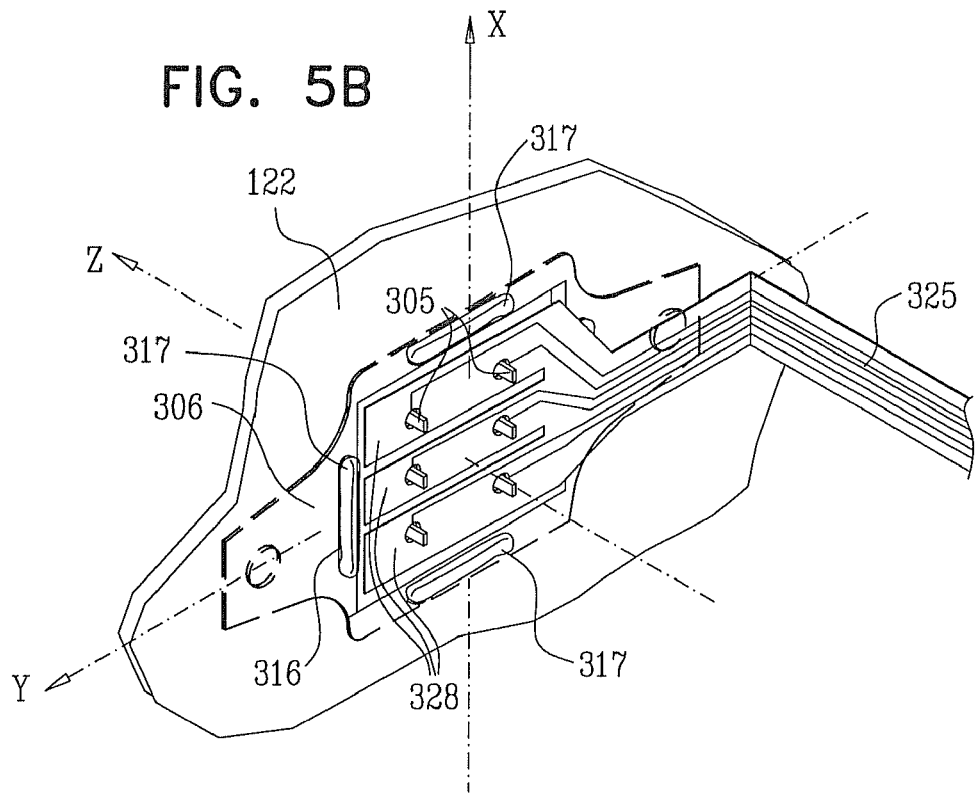

Reference is now made to FIG. 4, which is a simplified exploded view pictorial illustration of a magnetic card reader constructed and operative in accordance with another preferred embodiment of the present invention and to FIGS. 5A and 5B, which are assembled view pictorial illustrations of the magnetic card reader of FIG. 4.

As seen in FIGS. 4, 5A and 5B, the magnetic card reader preferably includes three single track heads 302, 303 and 304, which may be of conventional construction and are commercially available from Apollo (Zhuhai) Electronics Co., Ltd. such as Model Nos. AP-1150B and AP-1150. Each of heads 302, 303 and 304 includes a pair of data connection pins 305.

In accordance with a preferred embodiment of the present invention, a head mounting base element 306, preferably formed of spring steel, is provided with side portions 308 formed with apertures 310 which are configured to be engaged by protrusions 312 formed on wall 122 (FIG. 1). A central portion of head mounting element 306 is preferably formed with a generally rectangular aperture 314 for accommodating a thermoplastic elastomer overmold element 315, which is retained on head mounting base element 306 by overmolding into engagement with elongate apertures 316 formed on head mounting element 306, producing an overmolded extension 317 at each of apertures 316.

Heads 302, 303 and 304 are frictionally engaged in corresponding apertures 322, 323 and 324 in overmold element 315 which retains them in a preferably three-dimensional flexible, resilient manner.

Pins 305 of each of heads 302, 303 and 304 are electrically connected to corresponding electrical conductors 325 of a flexible printed circuit element 326, which is formed with three mechanically independent fingers 328, each having apertures 330 for receiving pins 305 of a corresponding one of heads 302, 303 and 304.

It will be appreciated by persons skilled in the art that the present invention is not limited by what has been particularly shown and described hereinabove. Rather the present invention includes both combinations and sub-combinations of various features described hereinabove as well as variations and modifications thereto which would occur to a person skilled in the art upon reading the foregoing description and which are not in the prior art.

The invention claimed is:

1. A point of sale device comprising:
    a housing;
    a card reading slot in said housing having first and second walls;
    a magnetic card reader disposed in said housing, said magnetic card reader including:
        at least first and second heads arranged in generally mutually parallel orientation;
        a flexible circuit board electrically coupled to said first and second heads; and
        a unitary resilient head mounting element disposed alongside one of said first and second walls and resiliently supporting said at least first and second heads to face said card reading slot independently of said flexible circuit board and independently of each other, such that said first and second heads may be slightly displaced out of said generally mutually parallel orientation; and
    electronic circuitry coupled to said magnetic card reader.

2. A point of sale device according to claim 1 and wherein said at least first and second heads are mutually displaceable with respect to X, Y and Z axes.

3. A point of sale device according to claim 2 and wherein said magnetic card reader is configured to provide enhanced quality of reading bent, warped or otherwise misshapen magnetic cards.

4. A point of sale device according to claim 2 and wherein said head mounting element is formed of spring steel.

5. A point of sale device according to claim 1 and wherein said magnetic card reader is configured to provide enhanced quality of reading bent, warped or otherwise misshapen magnetic cards.

6. A point of sale device according to claim 1 and wherein said head mounting element is formed of spring steel.

7. A magnetic card reader for disposition alongside a card reading slot having first and second walls, said magnetic card reader comprising:
    at least first and second heads arranged in generally mutually parallel orientation;
    a flexible circuit board electrically coupled to said first and second heads; and
    a unitary resilient head mounting element disposed alongside one of said first and second walls and resiliently supporting said at least first and second heads to face said card reading slot independently of said flexible circuit board and independently of each other, such that said first and second heads may be slightly displaced out of said generally mutually parallel orientation.

8. A magnetic card reader according to claim 7 and wherein said at least first and second heads are mutually displaceable with respect to X, Y and Z axes.

9. A magnetic card reader according to claim 8 and wherein said magnetic card reader is configured to provide enhanced quality of reading bent, warped or otherwise misshapen magnetic cards.

10. A magnetic card reader according to claim 8 and wherein said head mounting element is formed of spring steel.

11. A magnetic card reader according to claim 7 and wherein said magnetic card reader is configured to provide enhanced quality of reading bent, warped or otherwise misshapen magnetic cards.

12. A magnetic card reader according to claim 7 and wherein said head mounting element is formed of spring steel.

13. A point of sale device comprising:
   a housing;
   a magnetic card reader disposed in said housing, said magnetic card reader including:
      at least first and second heads;
      a flexible circuit board electrically coupled to said first and second heads; and
      a unitary resilient head mounting element resiliently supporting said at least first and second heads independently of said flexible circuit board, said head mounting element comprising three-dimensionally flexible head mounting leaves, each of which is attached to a side of one of said at least first and second heads; and
   electronic circuitry coupled to said magnetic card reader.

14. A point of sale device according to claim 13 and wherein said head mounting element is formed of spring steel.

15. A point of sale device according to claim 13 and wherein said at least first and second heads are mutually displaceable with respect to X, Y and Z axes.

16. A point of sale device comprising:
   a housing;
   a magnetic card reader disposed in said housing, said magnetic card reader including:
      at least first and second heads;
      a flexible circuit board electrically coupled to said first and second heads;
      a unitary resilient head mounting element resiliently supporting said at least first and second heads independently of said flexible circuit board; and
      a thermoplastic elastomer overmold element which is retained on said head mounting element and which frictionally engages said at least first and second heads in a three-dimensional flexible, resilient manner; and
   electronic circuitry coupled to said magnetic card reader.

17. A point of sale device according to claim 16 and wherein said at least first and second heads are mutually displaceable with respect to X, Y and Z axes.

18. A magnetic card reader comprising:
   at least first and second heads;
   a flexible circuit board electrically coupled to said first and second heads; and
   a unitary resilient head mounting element resiliently supporting said at least first and second heads independently of said flexible circuit board, said head mounting element comprising three-dimensionally flexible head mounting leaves, each of which is attached to a side of one of said at least first and second heads.

19. A magnetic card reader according to claim 18 and wherein said head mounting element is formed of spring steel.

20. A magnetic card reader according to claim 18 and wherein said at least first and second heads are mutually displaceable with respect to X, Y and Z axes.

21. A magnetic card reader comprising:
   at least first and second heads;
   a flexible circuit board electrically coupled to said first and second heads;
   a unitary resilient head mounting element resiliently supporting said at least first and second heads independently of said flexible circuit board; and
   a thermoplastic elastomer overmold element which is retained on said head mounting element and which frictionally engages said at least first and second heads in a three-dimensional flexible, resilient manner.

22. A magnetic card reader according to claim 21 and wherein said at least first and second heads are mutually displaceable with respect to X, Y and Z axes.

* * * * *